May 29, 1923.
A. M. ROSSMAN
1,456,652
ELECTRIC POWER GENERATING SYSTEM
Filed June 11, 1921
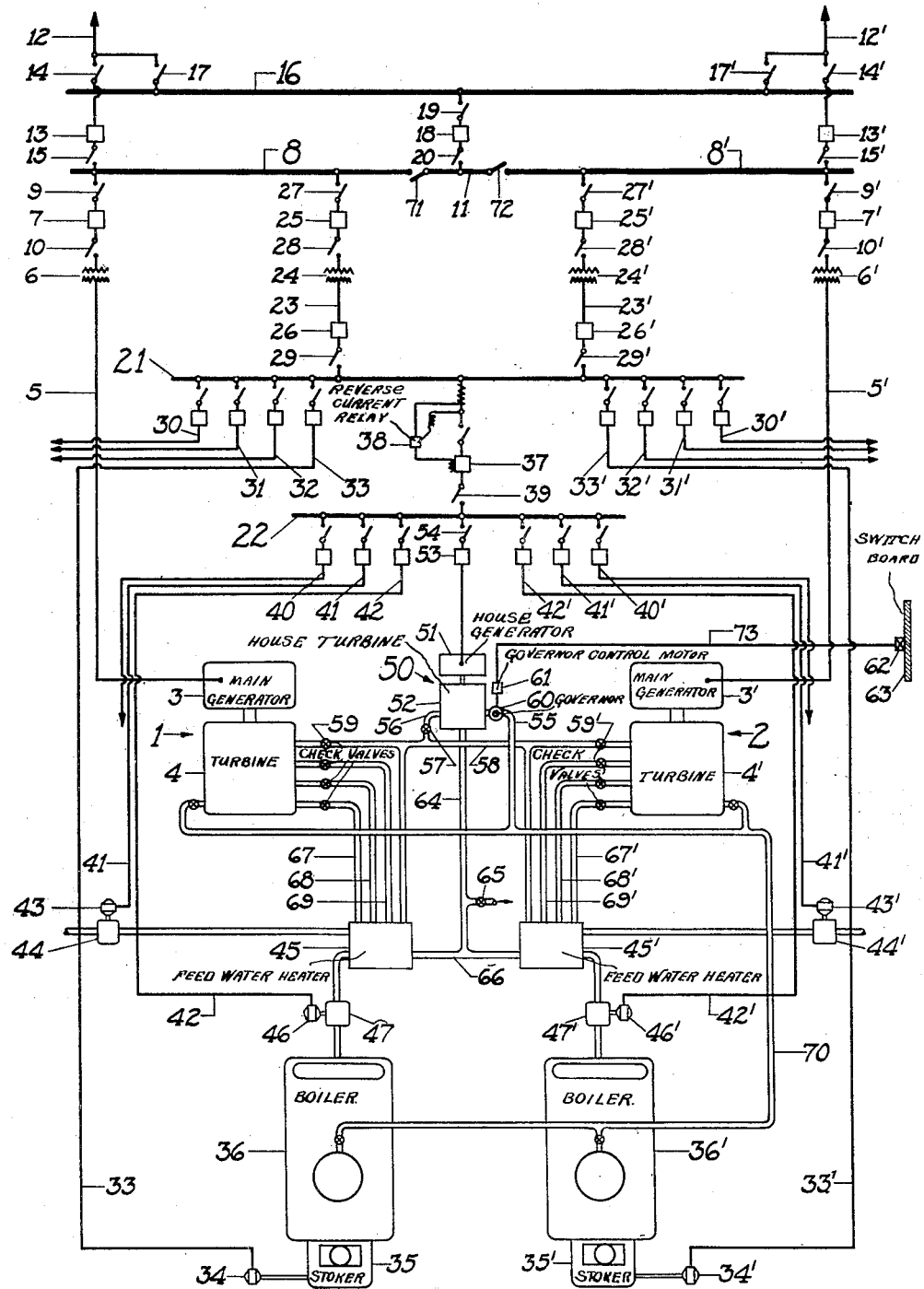

Patented May 29, 1923.

1,456,652

UNITED STATES PATENT OFFICE.

ALLEN M. ROSSMAN, OF CHICAGO, ILLINOIS, ASSIGNOR TO SARGENT & LUNDY, INCORPORATED, OF CHICAGO, ILLINOIS, A CORPORATION OF ILLINOIS.

ELECTRIC POWER-GENERATING SYSTEM.

Application filed June 11, 1921. Serial No. 476,701.

*To all whom it may concern:*

Be it known that I, ALLEN M. ROSSMAN, a citizen of the United States, residing at Chicago, in the county of Cook and State of Illinois, have invented a certain new and useful Improvement in Electric Power-Generating Systems, of which the following is a full, clear, concise, and exact description, reference being had to the accompanying drawing, forming a part of this specification.

My invention relates to electric power generating systems.

While the invention is particularly adapted to steam driven power plants, it is not to be limited to such installations, as the principle of the invention may be applied to gas driven, hydro-electric or other power systems.

The generation of electricity through the use of steam is performed most efficiently at present in large turbo-generator units. This practice of using large turbo-generator units for the sake of efficiency is not without its draw-backs. The single generating unit is much more subject to interruption and consequent stoppage of the generation of current completely than would be a system having a number of generating units. A steam power plant for the above purpose comprises, in addition to the turbine the necessary steam generating and auxiliary apparatus. While the economy of the main turbine may be relatively high, the overall efficiency of the plant is often considerably reduced by the lack of economy in the other parts of the equipment. In the central station there is considerable auxiliary apparatus which detracts from the efficiency of the plant, and any increase in the efficiency of this apparatus is highly desirable. This auxiliary apparatus can be divided into two general classes of service. First, the essential or uninterruptible service, and second, the interruptible service. The first class is characterized by the necessity for its operation if continuous operation of the power plant without damage or danger is to be secured. The second class, while it may be as essential under certain circumstances as the first class, need not be continuous, nor need it be performed at any invariable period of time. As an example of the first class, there are various auxiliaries to the boiler and condenser, such as:

1. Circulating water pump for the condenser;
2. Hotwell pump for withdrawing the condensate from the condenser;
3. Air pump for withdrawing air from the condenser;
4. Boiler feed pumps for keeping proper water level in boilers.

As an example of the second class there are certain other auxiliaries, such as:

1. Induced draft fans for the boiler;
2. Forced draft fans for the boiler;
3. Air washer for the generator;
4. Coal handling apparatus for the operation of the furnaces;
5. Crane for handling material;
6. Service pump for general water supply;
7. Screen motors for moving water screen.

While it is desirable to operate these devices efficiently, the prime requisite of the first class is reliability and continuity of service.

It has been the practice heretofore to drive the auxiliary apparatus in one of three ways. First, by separate steam driven motors. Second, by providing a special auxiliary transformer for converting or reducing the voltage from a high tension bus to a voltage suitable for distributing through an intermediate bus to the auxiliary motors. Third, by providing a special "house turbine," which comprises a turbo-generator and a suitable distribution system with motors for driving the auxiliary apparatus.

The first named manner of operating is highly inefficient, since the generation of power in a small unit is always carried on at a loss in efficiency. But reliability is unquestioned. The failure of any one piece of apparatus does not disable the other auxiliary apparatus, nor the main operating parts of the system. The second and third methods of operation are both preferable to the first and have been adopted in the more recently designed large systems as the best practice. I have observed where the house-turbine is employed that the system is not as efficient as would be the case if the auxiliary apparatus were driven from the main turbo-generator, because the generation of power in a house turbine is not carried on as efficiently as it is in a main turbo-generator, but raliability is improved.

I have conceived a method of operation, and means for carrying it out, whereby the waste incident to the continuous running of the house turbine at low efficiency for generating the current for the auxiliaries is greatly reduced. Fundamentally, my invention provides for idling of the house turbine at all times except when the main turbo-generator is out of commission. Then, the house turbine is put into commission for only such periods of time as are required to bridge over the gaps in the service of the main turbo-generator.

Obviously, the house turbine could not be kept standing still, and then suddenly thrown into service, since it is a matter involving a considerable period of time to bring a turbine up to speed, and to bring it to the proper operating temperature from a standing start. The auxiliary apparatus could not stand an interruption over so long a period as the starting of the turbine requires and, for example, the boiler feed pumps would permit the boiler to run dry and be ruined. The air pumps for the condenser would permit the condenser to become air-bound and lose its effectiveness. The cooling water would fail, and, in fact, the plant would go out of commission, and perhaps be seriously damaged. According to my invention, I cause the turbine to be maintained at full speed, and to be maintained at the proper temperature so that it can be thrown into service on a moment's notice. The idling of the house turbine is secured preferably by using the generator as a driving motor, taking the driving current from the main turbo-generator. Another way in which I may perform idling of the house turbine is to admit steam at a reduced pressure, such, for instance, as may be secured from the intermediate stage of the main turbine for driving the house turbine at a reduced speed.

It is preferable to idle the house turbine by means of its own generator acting as a motor (synchronous motor), since the economy of this method of operating is superior. However, it is necessary to admit a certain amount of steam or other cooling fluid to the house turbine while it is idling to prevent the wheel and blading from becoming overheated, due to the frictional contact with the air. A current of air could be passed through the turbine, but this is inadvisable, since this heat cannot well be recovered. I take steam from the later stages of the main turbine, admit it to the house turbine through a check-valve connection (which prevents counterflow when the live steam is admitted to the house turbine), and then employ the steam which is thus used for cooling the house turbine to heat the feed water. This conserves the heat which is contained within the steam as withdrawn from the main turbine, and also the heat which is added to it from the house turbine.

The essential auxiliaries are driven by motors taking current from the main generator thus operating at a relatively high efficiency, these motors all being fed from a special bus which is connected to the main generator bus through a reverse current relay-controlled switch. As soon as current fails from the main generator, the reverse current relay cuts off the bus bar for the essential auxiliary apparatus and the house turbine begins to slow down, due to lack of driving current. The slowing down of the turbine opens a live steam connection through the operation of a speed governor. The house turbine then picks up the load which is connected to the house bus, and supplies current to the essential auxiliaries. The governor of the house turbine may then be adjusted to bring the turbine to higher speed, this being done preferably from a remote control station.

It can be seen from the above general outline that I am able to operate the motors for the auxiliary apparatus from the main turbine, thus securing the high economy incidental to such apparatus, and at the same time the reliability and continuity of the service is guaranteed by the fact that the house turbine is ready to take up the load at any time.

The increase in efficiency that is effected by this method of operation is sufficient to raise the overall efficiency of the plant from 1.8% to 3.6% or even more.

In order to acquaint those skilled in the art with the manner of constructing and operating an embodiment of my invention, I shall now describe a particular embodiment of the same in connection with the accompanying drawing, which is a diagrammatic lay-out of a power plant employing my invention. In the construction of power stations, it is customary to group together the electrical and steam units which co-operate to form a section of the power system.

As shown in the single figure of the drawing, I employ two turbo-generator units 1 and 2, having generators 3 and 3' and turbines 4 and 4', respectively.

The generator 3 is connected by the usual cable 5 through the transformer 6 and oil switch 7 to the main bus 8 which may be maintained at a voltage of, for instance, 66 KV. The oil switch 7 is provided with disconnecting switches 9 and 10 in order to permit working on the oil switch, as is well understood by those skilled in the art. In a similar manner, the generator 3' is connected over the leads 5' through the transformer 6', and from thence through the oil switch 7′ and disconnecting switches 9′ and 10′ to the main bus 8′. The main busses 8 and 8′ are normally connected together through a short section 11 which has disconnecting switches 71 and 72 for tying this intermediate bus to the main busses 8 or 8′, or to both at the same time. The main bus 8 is adapted to be connected to an outgoing feeder 12 through the medium of the oil switch 13 and disconnect switches 14 and 15 when it is desired to supply the feeder 12 directly from the generator 3.

The feeder or line 12′ may be connected to the generator bus 8′ thru the oil circuit breaker 13′, the disconnects 14′ and 15′ being closed, or, it may be connected to the generator bus 8′ thru the oil circuit breaker 18′, the disconnect switches 19, 20 and 71 being closed.

A transfer bus 16 is provided so that any one of the feeders 12—12′ may be supplied from one or both of the generators 3—3′.

This transfer bus may be tied to the feeders 12—12′ through the disconnecting switches 17—17′, and it may be tied to the intermediate bus 11, and thus to the main busses 8 or 8′ through the oil switch 18, and the disconnect switches 19 and 20.

The apparatus thus far described is not of the essence of my invention, and it illustrates merely the connections which I may employ in order to secure proper distribution of current from the main generators 3 and 3′.

I provide, in addition to the above main busses, auxiliary bus and transfer bus, a pair of house busses 21 and 22.

These busses are maintained at a relatively low voltage, as, for instance, 600 volts for supplying current for use within the power house. These busses may be termed the 600-volt auxiliary busses. The house bus 21 is connected to the main busses 8 or 8′ through the leads 23 or 23′, in which leads are located the transformers 24—24′, oil switches 25—26 and 25′—26′, with suitable disconnecting switches 27—28—29 and 27′—28′—29′. The transformers 24—24′ reduce the voltage from the high voltage of the busses 8—8′, which is of the order of 66 KV to a voltage suitable for interior distributing purposes of the order of 600 volts.

The house bus 21 has connected thereto a number of distributing lines 30—31—32—33 and 30′—31′—32′—33′. These distributing lines lead to motors for operating auxiliary apparatus of the second or less important class above listed. For instance, in this case, the line 33 is shown as being connected to the motor 34 for driving the chain grate stokers 35 for the furnace of boiler 36. The line 33′ for the companion units is shown as being connected to the motor 34′ for driving the chain grate stoker 35′ for furnace of boiler 36′. Auxiliary apparatus of the second class which can stand interruption of service without damage to the plant is driven by motors connected to the house bus 21.

Auxiliary apparatus of the first class above referred to, such as feed water pumps, condenser pumps, circulating pumps and the like, is driven by motors connected to the house bus 22. The house bus 22 is connected to the house bus 21 through an oil switch 37 controlled by a reversed current relay 38. The oil switch 37 is opened through the control of the reversed current relay 38 whenever power fails to flow from the second house bus 21 to the first house bus 22 and begins to flow in the opposite direction.

A group of distributing lines such, for instance, as 40—41—42 and 40′—41′—42′ is connected to the first house bus 22. The distributing line 41 is shown as being connected to a motor 43 for driving the pump 44 for supplying feed water to the feed water heater 45. The line 42 is shown as being connected to the motor 46 for driving the boiler feed pump 47. It will be understood that other motors of the character outlined in the group above are connected to the first house bus 22 for driving the essential and noninterruptible auxiliary apparatus connected with the power plant.

The house turbo-generator unit 50 consists of the generator 51 and turbine 52. The generator 51 is connected through the oil switch 53 to the first house bus 22.

The turbine 52 is adapted to be supplied with live steam by way of the steam main 55 or to be supplied with steam at a reduced pressure through the connection 56, which connection 56 leads through a check valve 57 to an intermediate stage of the steam turbines 4—4′, these stages being connected by a pipe 58 and having check valves 59 and 59′ for preventing counterflow of steam back into said turbine.

The live steam connection 55 is controlled by a speed controlled governor, such as a fly ball governor 60, this governor being adjustable by means of a motor 61 to adjust the setting of the governor 60, so that steam will be admitted at the desired speed of the turbine, and so that the speed of the turbine may be controlled. The motor 61 is connected by a control line or pilot wire 73 to a suitable switching device 62 mounted on the switch board 63 which preferably comprises a panel of the main power plant switchboard altho this may be varied.

The current for the motor 61 is supplied from the first house bus 22. The switch board 63 is preferably but not necessarily a part of the main switchboard which has the controls for the various switches above enumerated. The switching device 62 may be placed at any suitable control point where it is convenient for operation by the engineer in charge of the station. The main switchborad which bears the indicating and control instruments for the plant or for a particular section of the plant is generally most convenient.

The exhaust steam from the house turbine passes through the pipe 64 going either to atmosphere at 65 if desired, or to the feed water heaters 45—45' by way of the pipe 66.

The heating of the feed water is an important requirement, and for this purpose steam is drawn from the intermediate stages of the turbines 4 and 4'. For example, taps 67—68 and 69 lead from different stages of the turbine 4 to the feed water heater 45, and in a similar manner, taps 67', 68' and 69' lead from the turbine 4' to the feed water heater 45'. Live steam is delivered through the turbines 4 and 4' from the boilers 36—36' by means of a common steam main 70.

I have indicated in the above described diagram only sufficient apparatus to make clear the character and practice of my invention, it being deemed both unnecessary and inadvisable to illustrate all the details of the power plant, only sufficient apparatus being indicated to make clear the manner of constructing and operating the system.

The operation of the system embodying my invention will now be described:

Assuming that the main turbo-generator 1 is in service, and is being supplied with steam from both boilers 36—36': The various necessary auxiliaries which are connected to the first house bus 22 are in operation, these auxiliaries being such as outlined above, including such devices as the boiler feed pumps, condenser air pumps, circulating water pumps, etc., these devices being driven by their respective motors and drawing current from the first house bus 22, which is at this time connected to the second house bus 21, and in turn to the main bus 8. Current for driving these motors is generated by the turbo-generator unit 1, which is also supplying current for the load, which we will assume is connected to the feeder 12. At this time current flows from the first house bus 22 through the oil switch 53 to the generator 51 of the house turbine 50, thereby maintaining the house turbine 50 in constant readiness for operation. The generator 51 operating as a synchronous motor drives the turbine 52 at a speed slightly above that at which live steam would be admitted. In other words, the governor 60 is adjusted by means of the motor 61 from the remote control station 62, so that no steam is admitted at the speed at which the generator 51 operating as a synchronous motor drives the combined units. A certain amount of semi-expanded steam from an intermediate stage of the turbine 4 is injected into the turbine 52 to cool the wheels and buckets of this turbine, which would otherwise heat from frictional contact with the air. The exhaust steam which has thus performed the function of cooling this turbine passes out by way of the pipe 64 and through the connection 66 to the feed water heater 45, where it returns its heat to the feed water.

The reversed current relay 38 is so actuated by a flow of current from the second house bus 21 to the first house bus 22 that the oil switch 37 is held in closed position maintaining a flow of current from the main bus 8 to said first house bus which supplies the non-interruptible auxiliaries and the generator of the house turbine 50.

For the above stated purpose of cooling the turbine 52, steam is taken from an intermediate stage of the main turbine 4 through the pipe 58, check valve 59 and check valve 57 into the interior of the turbine 52 for cooling the turbine, thus steam being discharged by way of the exhaust pipe 64 either to the atmosphere as desired, or to the feed water heater 45 by way of the pipe 66.

The apparatus connected to the second house bus 21 is of a character which may stand interrupted service.

Assume that the supply of current from the main generator fails. As soon as this occurs, the main generator 4 will be cut off from the main bus 8 by automatic control mechanism (not shown) for opening the switch 7. This switch may be controlled by a no voltage condition or by reversed current flow condition if desired. The result is that no further current is delivered to the second house bus 21 from the main bus 8, and consequently the only source of current supply for the second house bus and the first house bus is the house turbo-generator 50. Due to the fact that this turbo-generator has inertia of motion, it will tend to deliver current to the first and second house busses by its counter E. M. F., at the same time reducing its own speed both by its own inherent friction and by the braking action which is exerted upon it by the generation of current, in other words, dynamic braking. As soon as the speed drops to a point where the governor 60 functions, live steam will be admitted to the turbine 52, and the generator 51 will pick up the load of the first house bus, and will attempt to supply current to the second house bus. However, the reversed current relay 38 is at once energized as soon as current begins to flow to the house bus 21 from the first house bus 22, opening the oil switch 37 leaving the first house bus 22 connected to the house generator 51, so that the house generator supplies the motors for the essential and uninterruptible auxiliaries. Since the turbine 52 is now driven at a slightly reduced speed, it is apparent that the frequency will also be slightly less than desired, but this will have no detrimental effect on carrying on the essential auxiliaries until such time as the attendant can change the setting of the governor 60 to bring the speed of the turbine 52 to the proper value. As a matter of fact, the adjustment of the governor 60 by means of the motor 61 is not absolutely essential to the operation of the system, but it is merely desirable in the interest of efficiency and better operation of the system. The house turbine 50 will thereupon carry the load of the essential auxiliaries until such time as the main generator 1 or 2 may be put into service. As soon as the main generator is again put in service, the load offered by these essential auxiliaries may again be taken up by the main generator, and the house turbine relegated to idling condition.

During the time that the house turbine is carrying the load of the essential auxiliaries, the exhaust steam from the house turbine is permitted to escape to the feed water heater or to atmosphere as desired, but no return of the live steam from this turbine to the stages of the main turbines 1 and 2 is permitted, because of the check valve arrangement which has been previously described.

Assuming that the main generating unit 1 is again put into operation, or that the unit 2 has been warmed and brought to speed, the house turbine will now be relieved of its load as follows. The active unit, for instance unit 1, will be connected to the main bus 8 and in turn connected to the house bus 21 for starting the interrupted auxiliaries. Thereupon, the main generator and the house generator will be synchronized and connected together through the oil switch 37 so that the two are tied together in synchronism.

The adjustment of the governor 60 is then varied from the switch board 63, or it may be done manually to bring the adjustment to such a relation to the speed of the generator that no steam will be admitted.

Thereupon, the turbine 52 merely idles, being driven by the generator 51 which operates as a motor, and since live steam has been cut off from the turbine 52, steam from one of the intermediate stages as by way of the pipe 58 passes through the check valve 57 into the interior of the turbine for cooling it, as previously described.

Thereupon, the essential auxiliaries are operated from current derived from the main generator without interruption.

It will be understood from the above that I have provided a system in which the overall economy of the system is greatly increased, since the auxiliary apparatus is operated by electric motors driven from the main turbine which generates current at a maximum efficiency and the constant loss in efficiency of the house turbo generator is reduced to substantially zero, because this device is not employed for power generating purposes, but is merely idled to keep the same in condition for instantaneous picking up of the load in case of interruption of the main generator. It is more economical to obtain steam for heating feed water by bleeding it from the lower stages of the main turbine than by using exhaust steam from small turbines. With reliability of power assured, the boiler feed pumps may be motor driven and advantage can then be taken of the increased economy due to bleeding steam for heating the feed water.

The gain in efficiency which results from the employment of my invention may be readily computed and ascertained. The actual increase in the overall plant efficiency will normally be of the order of 1.8 per cent to 3.6 per cent. Under favorable circumstances it will be higher. The gain in efficiency is not the only advantage in the invention. The increased reliability which follows from my invention is a very important feature thereof.

It is to be understood that I do not limit the invention to the particular manner of use above recited.

I claim:

1. In an electric power generating station employing a main prime mover driven power generator of large capacity, electric motor driven auxiliary apparatus, which must provide uninterrupted service, and an auxiliary prime mover driven generator of a capacity great enough to provide current to said auxiliary apparatus, the method of operation which comprises idling the auxiliary prime mover driven power generating apparatus while the main generator is in operation, and simultaneously taking current from said main generator to drive the auxiliary apparatus, then stopping the operation of the main generator and substantially simultaneously admitting power to the prime mover of the auxiliary generator to cause it to generate current, then drawing current from said auxiliary generator for driving said auxiliary apparatus.

2. In combination, a main prime mover, a main generator driven thereby, a bus, an auxiliary prime mover, an auxiliary generator driven thereby, means for supplying current from the bus to the auxiliary generator to drive the auxiliary generator and its connected prime mover idle, and means controlled by failure of current from the main generator to admit working fluid to the auxiliary prime mover to cause it to assume the load connected to said bus.

3. In a power generating station, a main turbo generator, a main bus, a house turbo generator, a house bus, auxiliary apparatus having a motor connected to the house bus, means for normally connecting the house bus to the main bus and means for disconnecting the house bus from the main bus when the potential on the main bus fails, said house turbo generator being normally idled by current from the main bus, and means governed by failure of the main generator to supply current for admitting steam to the house turbo generator.

4. In combination, a main prime mover, a main generator driven thereby, a bus, an auxiliary prime mover, an auxiliary generator connected thereto, means for supplying current from the bus to the auxiliary generator to drive the auxiliary generator and its connected prime mover idle, means for supplying working fluid to the auxiliary prime mover, and a governor normally shutting off said working fluid when the auxiliary generator is driven by current from said bus and admitting fluid when current from the main generator fails.

5. In combination, a main prime mover, a main generator driven thereby, a bus, an auxiliary prime mover, an auxiliary generator connected thereto, means for supplying current from the bus to the auxiliary generator to drive the auxiliary generator and its connected prime mover idle, means for supplying working fluid to the auxiliary prime mover, and a governor normally shutting off said working fluid when the auxiliary generator is driven by current from said bus and admitting fluid when current from the main generator fails, a load to be driven at all times from one of said generators, and means for changing the setting of the governor to cause the auxiliary prime mover to carry the load.

6. In combination, a main prime mover, a main generator driven thereby, a bus, an auxiliary prime mover, an auxiliary generator connected thereto, means for supplying current from the bus to the auxiliary generator to drive the auxiliary generator and its connected prime mover at idling speed, means for supplying working fluid to the auxiliary prime mover, and a speed controlled governor normally shutting off the admission of working fluid so long as the auxiliary generator is driven by current from the main generator.

7. In combination, a main prime mover, a main generator driven thereby, a bus, an auxiliary prime mover, an auxiliary generator connected thereto, means for supplying current from the bus to the auxiliary generator to drive the auxiliary generator and its connected prime mover at idling speed, means for supplying working fluid to the auxiliary prime mover, and a speed controlled governor normally shutting off the admission of working fluid so long as the auxiliary generator is driven by current from the main generator, means for disconnecting the main and auxiliary generators from each other when the current from the main generator fails, and means to change the setting of the speed control governor to cause it to raise the speed of the auxiliary prime mover while the auxiliary generator is supplying the load.

8. In combination, a main prime mover, a main generator driven thereby, a main bus, a main load connected to said bus, an auxiliary prime mover, an auxiliary generator connected thereto, a house bus, an auxiliary device having a motor connected to said house bus, means for supplying current from the main bus to the house bus, means for supplying current from the house bus to the auxiliary generator to drive the auxiliary generator and its connected prime mover idle, and means for disconnecting the house bus from the main bus when current from the main generator fails.

9. In combination, a main prime mover, a main generator driven thereby, a main bus, a main load connected to said bus, an auxiliary prime mover, an auxiliary generator connected thereto, a house bus, an auxiliary device having a motor connected to said house bus, means for supplying current from the main bus to the house bus, means for supplying current from the house bus to the auxiliary generator to drive the auxiliary generator and its connected prime mover idle, and means for disconnecting the house bus from the main bus when current from the main generator fails, means for admitting working fluid to the auxiliary prime mover including a speed controlled governor, said governor being normally adjusted to cut off the flow of steam so long as the auxiliary generator is driven by current from the main generator.

10. In combination, a main prime mover, a main generator driven thereby, a main bus, an auxiliary bus, auxiliary devices having motors connected to said auxiliary bus, an auxiliary prime mover, an auxiliary generator connected thereto, said auxiliary prime mover being connected to said auxiliary bus, said auxiliary generator being driven by current from the main generator to idle the auxiliary generator and its connected prime mover, means to supply working fluid to the auxiliary generator including a governor which shuts off the flow of working fluid so long as the auxiliary generator is driven at idling speed by current from the main generator.

11. In combination, a main prime mover, a main generator driven thereby, a main bus, an auxiliary bus, auxiliary devices having motors connected to said auxiliary bus, an auxiliary prime mover, an auxiliary generator connected thereto, said auxiliary prime mover being connected to said auxiliary bus, said auxiliary generator being driven by current from the main generator to idle the auxiliary generator and its connected prime mover, means to supply working fluid to the auxiliary generator including a governor which shuts off the flow of working fluid so long as the auxiliary generator is driven idle by current from the main generator, a remote control station and means at said remote control station for controlling the setting of said governor.

12. The method of operating a power generating system having a main turbo generator and an auxiliary turbo generator which comprises, idling the auxiliary turbo generator by means of current drawn from the main generator and simultaneously passing steam at reduced temperatures through the turbine of said auxiliary turbo generator to cool the same.

13. The method of driving the essential auxiliary apparatus of a power station having a main turbo generator and an auxiliary turbo generator which comprises, idling the auxiliary turbo generator by means of current drawn from the main generator until the current from the main generator fails, then disconnecting the generator of the auxiliary turbo generator from the main generator and admitting working fluid to the turbine of the auxiliary turbo generator to cause the auxiliary turbo generator to supply current to the auxiliary apparatus.

14. The method of operating a power generating system having a main prime mover and generator unit and an auxiliary prime mover and generator unit which comprises, idling the auxiliary unit by means of current drawn from the main generator and operating the auxiliary generator as a motor until the current from the main generator fails, then disconnecting said generator and admitting working fluid to the prime motor of the auxiliary unit to cause the auxiliary unit to supply current to the load.

15. In a power station, a main unit comprising a prime mover and a generator, a house unit comprising a prime mover and a generator, auxiliary apparatus continuous operation of which is required for the operation of the station, means for normally driving the auxiliary apparatus by current from the main generator, a connection for idling the house unit by supplying current from the main generator to the house generator, and means for admitting working fluid to the prime mover of the house unit when the current from the main generator fails, for generating current to drive the auxiliary apparatus.

16. In a power station, a main unit comprising a turbine and a generator, a house unit comprising a turbine and a generator, auxiliary apparatus continuous operation of which is required for the operation of the station, means for normally driving the auxiliary apparatus by current from the main generator, a connection for idling the house unit by supplying current from the main generator to the house generator, means for admitting working fluid to the prime mover of the house unit when the current from the main generator fails, for generating current to drive the auxiliary apparatus, a feed water heater for the boilers of the station, and means for admitting steam from the intermediate stages of the main turbine to heat the feed water.

17. In combination, a main prime mover, a main generator driven thereby, an auxiliary prime mover, an auxiliary generator driven thereby, means for supplying current continuously from the main generator to the auxiliary generator to drive the auxiliary generator and its connected prime mover idle so long as the main generator is being driven and means for cooling the driven prime mover.

18. In combination, a main prime mover, a main generator driven thereby, an auxiliary prime mover, an auxiliary generator adapted to be driven thereby, means for supplying current continuously from the main generator to the auxiliary generator, to drive the auxiliary generator and its connected prime mover idle, said means comprising a reverse current relay between said generators for disconnecting the generators when the main generator fails to deliver current to the auxiliary generator.

19. In combination, a main prime mover, a main generator driven thereby, a main bus bar, an auxiliary prime mover, an auxiliary generator adapted to be driven thereby, auxiliary apparatus of a non-interruptible characteristic connected to the auxiliary bus bar, means connecting the main bus bar and the auxiliary bus bar for delivering current from the main generator to the auxiliary generator to drive the same as a motor so long as the main generator is in service.

20. In combination, a main prime mover, a main generator driven thereby, a bus bar connected to the main generator, an auxiliary prime mover, an auxiliary generator adapted to be driven thereby, a second bus bar connected to the auxiliary prime mover and a reverse current relay controlled circuit breaker for connecting the second bus bar to the first bus bar for the delivery of current from the main generator to the auxiliary generator, which acts as a motor to idle the auxiliary prime mover.

21. In a steam electric power generating station having a boiler and employing a main turbo generator of large capacity, electric motor driven auxiliary apparatus which must provide substantially uninterrupted service and an auxiliary turbo generator of a capacity great enough to provide current to drive said auxiliary apparatus, the method of operation which comprises, driving the auxiliary turbo generator idle by current drawn from the main turbo generator to maintain it substantially in condition to pick up its load instantly, while the main turbo generator is in operation, and simultaneously driving the auxiliary apparatus by current drawn from the main turbo generator, and transferring the heat generated by idling of said auxiliary turbo generator to the feed water for the boiler.

22. In an electric power generating station having a main turbo generator of large capacity, electric motor driven auxiliary apparatus which must provide uninterrupted service and an auxiliary turbo generator of a capacity great enough to provide current to drive said auxiliary apparatus, the method of operation which comprises driving the auxiliary turbo generator idle by current drawn from the main generator to maintain it substantially in condition to pick up load instantly while the main turbo generator is in operation, simultaneously driving the auxiliary apparatus by current drawn from the main turbo generator, decreasing the delivery of current from the main generator to the auxiliary generator to cause it to drop in speed, then admitting steam to the auxiliary turbo generator to cause it to generate current for the auxiliary apparatus.

23. In combination, a main generator having a prime mover therefor, an auxiliary generator having a prime mover therefor, a connection between said generators comprising an automatic switch for disconnecting said generators when the main generator fails to function, auxiliary apparatus connected to said connection on the auxiliary generator side of said automatic switch, and a speed controlled governor normally set to cut off the supply of power to the prime mover of the auxiliary generator when the auxiliary generator is driven at synchronous speed by the current from the main generator.

24. In combination, a main generator having a prime mover therefor, an auxiliary generator having a prime mover therefor, a connection between said generators comprising an automatic switch for disconnecting said generators when the main generator fails to function, auxiliary apparatus connected to said connection on the auxiliary generator side of said automatic switch, and a speed controlled governor normally set to cut off the supply of power to the prime mover of the auxiliary generator when the auxiliary generator is driven at synchronous speed by current from the main generator, said governor having control means for adjusting the setting thereof to bring the speed of the auxiliary generator up to synchronous speed while supplying current to said auxiliary apparatus.

25. In combination, a main generator having a prime mover therefor, an auxiliary generator of relatively small capacity having a prime mover connected thereto, and a connection between said generators comprising an automatic switch for disconnecting said generators when the main generator fails to function, said connection normally supplying current from the main generator to the auxiliary generator to drive the latter as a motor, auxiliary apparatus of an interruptible character having motors joined to said connection on the main generator side of the automatic switch, an auxiliary apparatus required to keep continuous service, having motors joined to said connection on the auxiliary generator side of said automatic switch.

26. In a power plant, a main turbo generator set, a house turbo generator set, motor driven auxiliary apparatus for the power plant, said apparatus being of two classes, first, apparatus which may be discontinued temporarily, and second, apparatus which may not be discontinued during operation of the plant, a house bus connected to the house generator, a main bus connected to the main generator, apparatus of the first class connected to the main bus, and apparatus of the second class connected to the house bus, a connection between said busses comprising a circuit breaker for disconnecting said busses when the voltage of the house bus exceeds that of the main bus, the turbine of the house turbo generator set having a governor which is set for a speed below the synchronous speed of the main turbo generator.

27. In a power plant, a main turbo generator set, a house turbo generator set, a main bus connected to the main turbo generator, a house bus connected to the house turbo generator, motor driven auxiliary apparatus for the power plant, said apparatus being of two classes, first, apparatus which may be discontinued temporarily, and second, apparatus which may not be discontinued during operation of the plant, said apparatus of the first class being connected to the main bus, and said apparatus of the second class being connected to the house bus, a connection between said busses comprising a reverse current controlled circuit breaker, the turbine of the house turbo generator set having a speed controlled governor which is set for a speed below the synchronous speed of the main turbo generator, and means for adjusting said governor while the house turbo generator set is in operation to bring the speed of said house turbo generator set to the synchronous speed of the main turbo generator set.

28. The methd of conserving the energy of a rotating turbine in a steam driven power plant having a main turbo generator and a house turbo generator idled by curent from the main turbo generator, which comprises injecting steam from a later stage of the main turbine into contact with the rotating part of the house turbine, and transferring the heat of said steam to the feed water for the boiler supplying steam to the main turbine.

29. In a steam driven power plant employing a house turbo generator driven by current from the main turbo generator, the method of conserving the heat of the friction losses on the vanes and blading of the turbine of the house generator which comprises passing steam through said turbine to absorb the heat of fluid friction with the moving parts and transferring the heat of the steam so used to the feed water for the main turbine.

30. In a steam driven power plant employing a main turbine generator and a house turbo generator, the method of increasing the efficiency of the plant which comprises expanding steam in the turbine of the main turbo generator to drive its generator and to cool the steam, driving the turbine of the house turbo generator set by current drawn from the main generator, injecting some of the steam expanded in the main turbine into the house turbine to cool the same, and transferring the heat of said steam to the feed water for the main turbine.

In witness whereof, I hereunto subscribe my name this 8th day of June 1921.

ALLEN M. ROSSMAN.